Nov. 4, 1952  J. L. JONES  2,616,422
VAGINAL APPLICATOR
Filed Oct. 18, 1948  2 SHEETS—SHEET 1

JOHN LESLIE JONES,
INVENTOR.

BY Lyon & Lyon
ATTORNEYS.

Nov. 4, 1952    J. L. JONES    2,616,422
VAGINAL APPLICATOR
Filed Oct. 18, 1948    2 SHEETS—SHEET 2
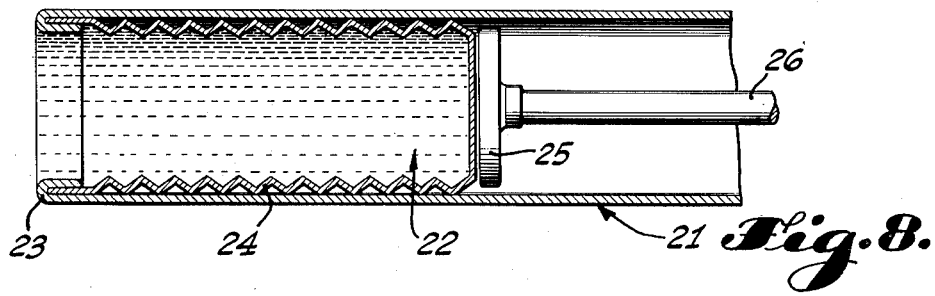
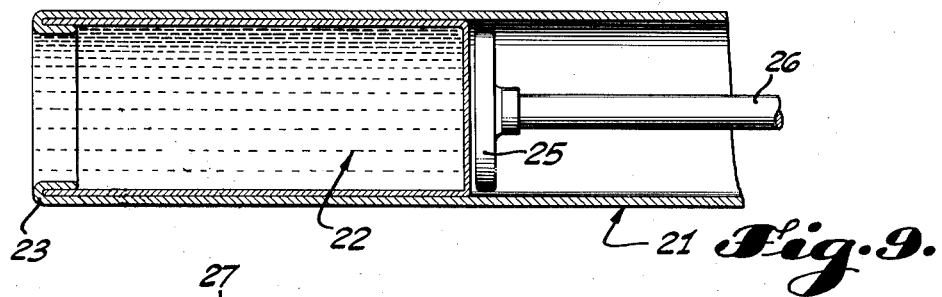
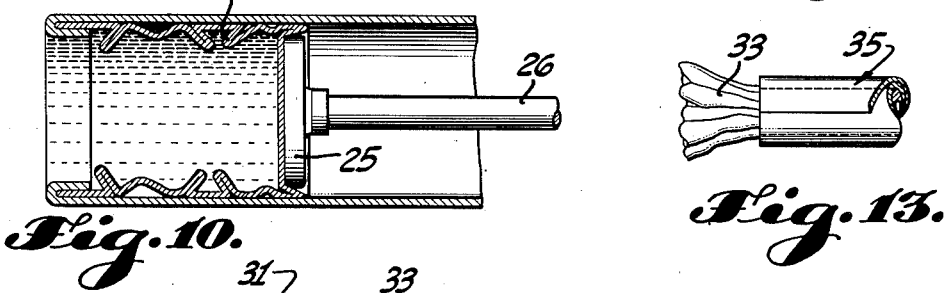
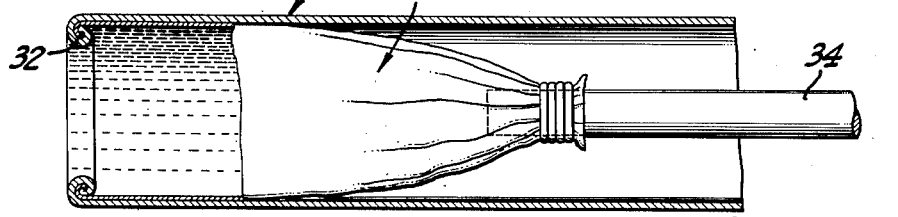
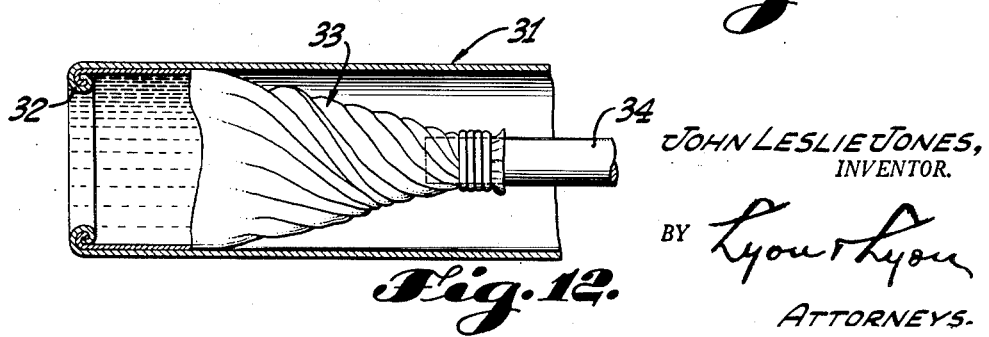
JOHN LESLIE JONES,
INVENTOR.
BY Lyon & Lyon
ATTORNEYS.

Patented Nov. 4, 1952

2,616,422

UNITED STATES PATENT OFFICE 2,616,422

VAGINAL APPLICATOR

John Leslie Jones, Los Angeles, Calif.

Application October 18, 1948, Serial No. 55,030

23 Claims. (Cl. 128—261)

This application relates to vaginal applicators; that is, to devices for applying substances within the human or animal vagina, particularly in devices designed to apply substances in proximity to the uterus.

This application is filed as a continuation-in-part of my copending application, Serial No. 786,919, filed November 19, 1947. In this application, I intend to claim generically the subject matter of the present application and my copending application and all subject matter common to the present application and my copending application, except as to claims specific to Figures I, V and VI of said application, Serial No. 786,919 as originally filed. Said application, Serial No. 786,919 issued March 27, 1951 and bears Patent No. 2,546,754.

Included in the objects of my invention are:

First, to provide a vaginal applicator which is economical of manufacture and utilizes inexpensive materials so that it may be disposable; that is, employed for a single use, then discarded;

Second, to provide a vaginal applicator which is inherently hygienic; that is, it may be manufactured and filled at a central plant under sanitary conditions, then sealed until ready for use;

Third, to provide a vaginal applicator which is suitable for application of medicines for treatment of the vagina or uterus of humans or animals, or may be employed for purposes of artificial insemination; and Fourth, to provide a device of this class which may be so arranged as to contain either a viscous or semisolid material, or a true liquid, as desired.

With the above and other objects in view, as may appear hereinafter, reference is directed to the accompanying drawings in which:

Figure 8 is a fragmentary sectional view of a modified form of my applicator wherein a collapsible or crushable, initially pleated container is employed;

Figure 9 is a similar fragmentary sectional view of a further modified form of my invention wherein a collapsible or crushable initially straight wall container is employed;

Figure 10 is a similar sectional view showing the parts in the course of discharging the contents of the applicator;

Figure 11 is a fragmentary longitudinal sectional view of a further modification of my invention wherein a container in the form of a constrictable bag is employed;

Figure 12 is a fragmentary sectional view thereof illustrating the applicator in operation; and Figure 13 is a fragmentary view thereof showing a modified form of connection between the constrictable container and means whereby constriction is effected.

Figure 1:
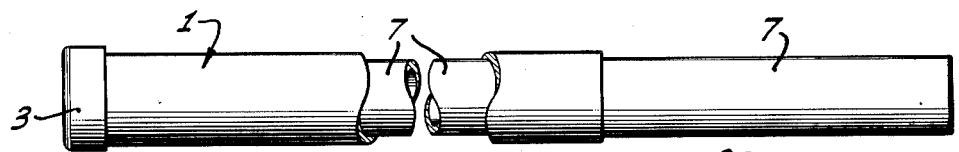
Figure 1 is an elevational view of my vaginal applicator.
Figure 2:
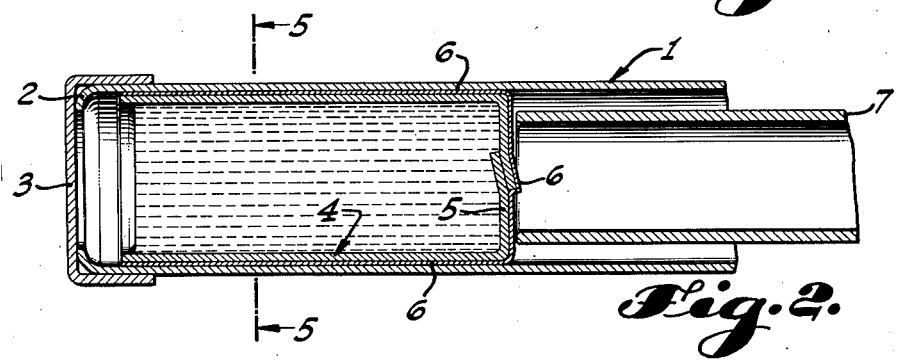
Figure 2 is an enlarged fragmentary longitudinal sectional view showing one form of my vaginal applicator with the parts in the positions assumed prior to use and wherein an invertible container is employed.

Reference is first directed to the construction shown in Figures 1–6. In the construction here illustrated an outer tube 1 is provided. The tube is preferably formed of paper which because of its low cost permits disposal after a single use. However, other materials may be substituted as will be discussed in more detail hereinafter. The thickness of the tube is such as to render the tube substantially rigid under conditions of use.

The tube 1 is provided with an inwardly curved or constricted end 2 to facilitate its insertion into the vagina and prior to use is provided with a suitable removable closure 3. Within the insertable end of the tube there is provided a container 4 which may be formed of aluminum foil or which may be formed of paper or other material as will be brought out hereinafter.

The container 4 is provided with a closed inner end 5 remote from the constricted end of the outer tube. The container may be initially tubular and its inner end formed by folding the material radially. The exterior of the container 4 is coated with an adhesive 6 which bonds its side walls to the inner surface of the outer tube 1. The bond is such that the container may be stripped from the outer tube without tearing an opening in the container walls; for example, paraffin or a paraffin-like substance may be employed as an adhesive, in which case the adhesive itself will rupture; that is, rupture will occur along the plane A indicated in Figure 4, or the confronting surface of either tube may be so prepared as to separate from the adhesive. Still further, the material of the outer tube or container may be such as to split longitudinally in the plane B or C, respectively, indicated in Figure 4.

Figure 3:
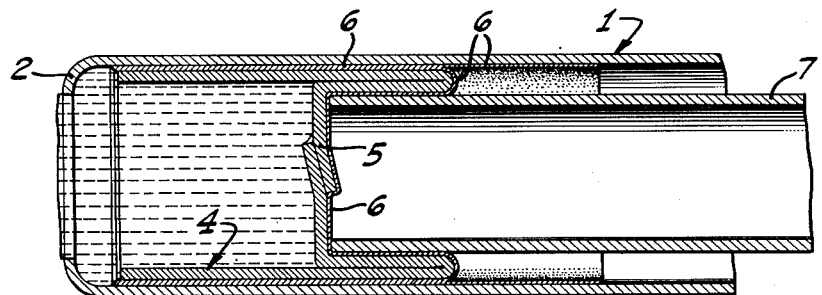
Figure 3 is a similar fragmentary sectional view showing the parts in the course of discharging the contents of the applicator.
Figure 4:
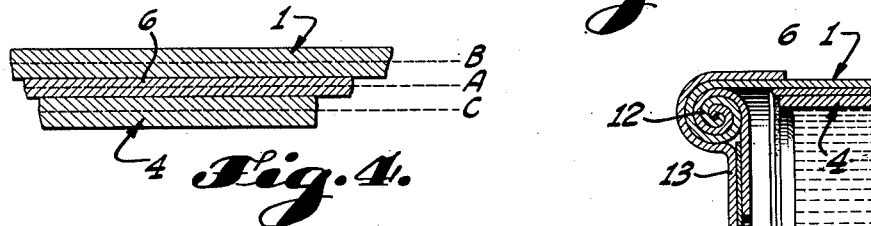
Figure 4 is a substantially diagrammatical sectional view showing a wall of the applicator to facilitate explanation of its operation.

It is desired to strip the container 4 from the outer tube in order to facilitate inversion of the container when subjected to axial compression as shown in Figure 3. Such inversion is accomplished by means of a plunger tube 7 mounted slidably within the outer tube 1 and adapted to bear against the inner end 5 of the container. The proportions and clearances are such that a plunger tube can pass within the inverted container and retain the walls of the folded portion of the container in sliding "piston" relation with the normal walls so that efficient ejection of the contents is effected.

Figure 6:
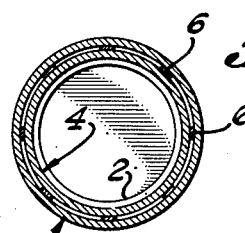
Figure 6 is a similar sectional view showing a modified construction.

It should be observed that the adhesive 6 need not completely cover the container but may be in the form of longitudinal strips as suggested in Figure 6, or arranged in other patterns if desired.

Figure 7:
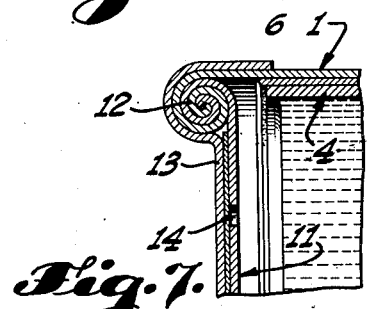
Figure 7 is a fragmentary sectional view showing my applicator as arranged for receiving a liquid.
Figure 5:
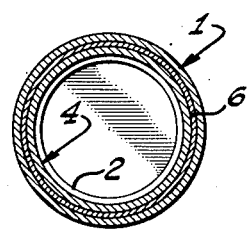
Figure 5 is a transverse sectional view through 5—5 of Figure 2.

The construction as shown in Figures 1-6 is adapted for use of a semisolid or viscous substance. The applicator may be adapted to the use of a liquid by closing the container 4 with an orifice plate 11 as shown in Figure 7. The orifice plate may be formed of paper or the like and joined to the outer tube as well as the container by rolling the peripheries of the container and tube as indicated by 12 in Figure 7. As in the first described structure, the end may be covered by a cap 13 and, if desired, in addition, a thin rupturable seal 14 may cover the opening or openings in the orifice plate. In this regard, it should be observed that the additional feature of an orifice plate may be included in any of the structures shown in Figures 1-6 or 8-12.

Reference is directed to the construction shown in Figure 8. The construction here shown involves a tubular shell 21 similar to the tube 1. Within one end of this shell is a container 22, the mouth of which is suitably sealed to the end of the shell, for example, by cementing and folding the tube to form a round edged rim 23. The container 22 is not attached to the shell as in the first described structure but instead is provided with incipient pleats 24 so that the container will fold or crush in a predetermined pattern when subjected to axial compression. This is accomplished by means of a plunger 26 and a head 25.

While it is desirable to score or otherwise form pleats in the container, it is not necessary to do so if the thickness of the container walls and the material selected are such as to offer low resistance to axial compression. Thus, as shown in Figure 9, the walls of the container 22 may be straight but when subjected to axial compression crush into random folds 27 as shown in Figure 10.

Reference is now directed to Figures 11-13. The structure here shown is tubular in shape and a tube 31 is provided, the inner end of which is joined by a sealed connection 32 in the manner of the previously described structures to a container bag 33 formed of soft yet tough material. The inner end of the bag is constricted and tied externally to a rod 34 as shown in Figures 11 and 12, or is gripped by a tubular member 35 as shown in Figure 13. With this construction the contents of the container are discharged by rotating the rod 34 or tubular member 35 so as to twist and constrict the bag.

It should be observed that the constructions shown in Figures 8-13 are arranged for reception of a semisolid or viscous fluid; however, by use of the orifice plate shown in Figure 7 they may be adapted to the use of a liquid.

While it is preferred to construct parts of my vaginal applicator of paper, it should be noted that other materials may be substituted; for example, the outer tubes or shells and the plungers or rods may be constructed of cellulose acetate, vinyl chloride-vinyl acetate copolymer, phenolic resin impregnated textile stock, urea-formaldehyde impregnated paper stock, paraffin wax impregnated paper, or other materials having comparable properties.

The containers disclosed in the various forms of my invention, if designed to be filled with a substance containing water, are formed of water-resistant material, such as rubber hydrochloride, natural rubber, polyethylene resin, synthetic rubber, paraffin wax impregnated paper, synthetic rubber impregnated paper, butyl methacrylate resin, aluminum foil, plasticized vinyl chloride, tin foil, or laminated paper-aluminum foil combination, or the like.

If the contents of the container contain oil, such materials as neoprene rubber, polyethylene resin, vinyl chloride-vinyl acetate copolymer resin, rubber hydrochloride, aluminum foil, tin foil or plasticized polyvinyl alcohol may be used.

With reference to the structure shown in Figures 1-6 inclusive, I have found that the inverted container herein shown functions satisfactorily and has a wall strength which will resist tearing if made of rubber hydrochloride foil of about 0.001" wall thickness, or of paraffin wax impregnated paper of about the same thickness, or of aluminum foil of 0.0005" thickness, or a polyethylene resin film 0.002" thick. It should be understood however that I do not wish to be limited to these materials or these dimensions but I specify them only for purposes of illustration.

The adhesive or bonding agent employed between the container and the surrounding tube of the structure shown in Figures 1-6 should be such that it partially absorbs the work done by the plunger and prevents the container from buckling or crushing in order that it will invert as shown in Figure 3. As pointed out hereinbefore, it is preferred that the adhesive itself rupture although it is feasible for the rupture plane to occur within the walls of either the container or the outer tube or at the interfaces between the container or tube and adhesive.

The specific adhesive selected depends upon the materials from which the container and tube are made. By way of example but not of limitation the adhesive may be of materials indicated in the following:

| Outer Tube 1 | Invertible Container 4 | Adhesive Layer 6 |
|---|---|---|
| Paper | Aluminum foil | Rubber cement. |
| Do | Rubber hydrochloride foil | Nitrocellulose. |
| Do | Aluminum foil | Silicone grease. |
| Do | Paraffin wax impregnated paper. | Methyl abietate. |
| Do | Aluminum foil | Paraffin wax. |
| Do | Paraffin wax impregnated paper. | Beeswax. |
| Do | Rubber hydrochloride foil | Do. |
| Do | Tin foil | Paraffin wax. |

The thickness of the adhesive layer of course may vary, but by way of example, the thickness of 0.003" was found suitable for a nitrocellulose adhesive.

It will be observed that all of the containers shown in the several modifications are crushable containers. The container shown in Figures 1–6 is crushed by inversion. The containers shown in Figures 8–10 are crushed by axial compression and the container shown in Figures 11–13 is crushed by twisting or wringing.

It is contemplated that each of the modifications shown may be adapted to contain a viscous or semisolid material, or to contain a liquid. The devices illustrated are particularly useful for artificial insemination in which the containers are filled with a seminal composition. In such cases the applicator is filled and stored or transported while maintained under proper conditions of temperature until ready for use.

Alternatively, the contents may be of viscous or semisolid material, but in any case a mobile medicament, or may be, for example, a very fluid physiological salt solution containing a medicament. In either case it is good hygienic practice to prepare or load the applicator in a factory where high sanitary standards may be rigidly maintained during large quantity production.

It is intended that the device be disposable; that is, used for the application of a single dose and then discarded.

While the various forms of my invention are shown as adapted to semisolids or liquids, it should be observed that they may be equally satisfactory for the application of dry powders as many powdered materials are sufficiently mobile as to be readily ejected.

It also should be observed that the plunger employed in the various embodiments of my invention may be conveniently formed of paper and is preferably of such length that when the plunger is forced inwardly as far as possible the inner end thereof will not push the container from the outer tube. Furthermore, the inturned end of the outer tube or the container itself may be so arranged as to prevent excessive travel of the plunger.

It should be further observed that in any case the material from which the container is constructed is selected with due regard for the chemical properties of its contents to permit storage and to avoid contamination.

While I have described the preferred embodiments of my invention, I am not limited to any of the details herein set forth except as described in the following claims.

I claim:

1. A single use vaginal applicator, comprising: a rigid open ended tubular member of uniform diameter formed of paper-like material; a crushable hollow container located therein adjacent one end thereof; and a device for crushing said container protruding from the remote end of said tubular member.

2. A single use vaginal applicator, comprising: a rigid open ended tubular member of uniform diameter formed of paper-like material; a crushable hollow container mounted within said tubular member and having a discharge end permanently secured to an end of said tubular member to prevent ejection of said container; and a device for crushing said container protruding from the remote end of said tubular member.

3. A single use vaginal applicator, comprising: a rigid open ended tubular member of uniform diameter formed of paper-like material; a crushable container less in length than said tubular member and permanently secured within said tubular member with its discharge end directed outwardly at one extremity of said tubular member; and a device for crushing said container and extending therefrom through and beyond the other extremity of said tubular member, said device having a protruding end adapted on predetermined movement relative to said tubular member to crush said container and discharge the contents thereof.

4. A single use vaginal applicator, comprising: a rigid open ended tubular member of uniform diameter formed of paper-like material; having an inner end adapted for insertion into the vagina; a crushable hollow container within said tubular member and having a discharge end located and permanently secured to the inner end of said tubular member; and a device accessible from the outer end of said tubular member operable to crush said container.

5. A single use vaginal applicator, comprising: a pair of freely slidable telescoping tubular elements, each of uniform diameter formed of paper-like material; a cartridge filled with a mobile substance and positioned within the outer of said elements adjacent one end, the walls of said cartridge being crushable in the response to axial force exerted by telescoping action of the inner of said elements to discharge its contents.

6. A single use vaginal applicator, comprising: an open ended tubular member of uniform diameter formed of paper-like material; an axially crushable hollow container for a mobile substance permanently secured in said tubular member with its discharge end adjacent an open end of said tubular member; and a plunger protruding from said tubular member, slidable in said tubular member to crush said container.

7. A single use vaginal applicator, comprising: an open ended tubular member of uniform diameter formed of paper-like material; having a diameter to facilitate entry into the vagina; an axially crushable hollow container for a mobile substance permanently secured within said tubular member and having a discharge end adjacent one end of said tubular member for discharge of its contents therethrough; and a plunger protruding from the other end of said tubular member to form a handle and engageable with said container to crush the same and discharge its contents.

8. A single use vaginal applicator, comprising: an open ended tubular member of uniform diameter formed of paper-like material; a collapsible container for mobile substances within said tubular member, and including a discharge end permanently secured by its periphery to an end of said tubular member, the remaining side walls of said container being axially and radially foldable to discharge its contents; and means accessible from the opposite end of said tubular member for collapsing said container.

9. A vaginal applicator as set forth in claim 8 wherein the walls of said container are pleated to cause folding of said container in a predetermined pattern.

10. A vaginal applicator as set forth in claim 8 wherein the side walls of said container are initially tubular but sufficiently weak to crush under axial compression exerted by pushing directly on and sliding said container collapsing means axially into said tubular member.

11. A vaginal applicator as set forth in claim 8, wherein; said container is in the form of a twistable bag secured at its mouth to said tubular member; and said operating device is a rod attached to said bag to exert a torsional force.

12. A vaginal applicator as set forth in claim 8, wherein; said container is attached to the tubular member by the periphery of its discharge end and includes axially and radially foldable side walls free of said tubular member; and said operating device is a freely slidable plunger adapted to exert an axial compression to crush said container.

13. A vaginal applicator as set forth in claim 8, wherein; said container is tubular in form and initially attached along its side walls to the interior of said tubular member; and said operating device is a plunger adapted to bear axially against said container to fold said container within itself thereby to discharge its contents.

14. A vaginal applicator, comprising: a container for mobile substances closed at one end, said end adapted to be folded within the container to invert the container and discharge its contents; a rigid tubular sleeve surrounding said container; a rupturable bonding means between said sleeve and container adapted to permit inversion of said container; and means for engaging the end of said container to effect inversion.

15. A single use vaginal applicator, comprising: a rigid open ended tubular member of uniform diameter formed of paper-like materials; a collapsible container for mobile substances within said tubular member, and including a discharge end permanently secured by its periphery to an end of said tubular member, the side wall of said container initially extending axially within said tubular member and closed at its axially inner end, said side wall being axially foldable in response to axial compression; and a plunger axially movable freely in said tubular member and accessible from the end thereof opposite from the discharge end of said container, for compressing said container and discharging the contents thereof.

16. A single use vaginal applicator, comprising: an open ended tubular member of paper-like material; a collapsible container for mobile substances within said tubular member, and including a discharge end permanently secured by its periphery to an end of said tubular member, the remaining side walls of said container being axially and radially foldable to discharge its contents; means accessible from the opposite end of said tubular member for collapsing said container; and an orifice plate covering the discharge end of said tubular member.

17. A vaginal applicator as set forth in claim 16 wherein the walls of said container are pleated to cause folding of said container in a predetermined pattern.

18. A vaginal applicator as set forth in claim 16 wherein the side walls of said container are initially tubular but sufficiently weak to crush under axial compression exerted by said collapsing means.

19. A vaginal applicator as set forth in claim 16 wherein; said container is in the form of a twistable bag secured at its mouth to said tubular member; and said operating device is a rod attached to said bag to exert a torsional force.

20. A vaginal applicator as set forth in claim 16 wherein; said container is attached to the tubular member by the periphery of its discharge end and includes axially and radially foldable side walls free of said tubular member; and said operating device is a plunger adapted to exert an axial compression to crush said container.

21. A vaginal applicator as set forth in claim 16 wherein; said container is tubular in form and initially attached along its side walls to the interior of said tubular member; and said operating device is a plunger adapted to bear axially against said container to fold said container within itself thereby to discharge its contents.

22. A single use applicator adapted for entry into the vagina to deposit substances adjacent the uterus, involving: a rigid tube of paper-like material, capable of ready entry into the vagina and of such length as to protrude therefrom when its inner end is in proximity to the uterus, thereby to provide a handle; a readily collapsible container within said tube having a discharge end permanently secured to the inner end of said tube and adapted to contain a mobile substance; and a member freely movable in said tube to collapse said container, said member protruding from said tube to form a second handle whereby after insertion of said tube in the vagina to a position with its inner end adjacent the uterus, the contents of said container may be discharged in the vicinity of the uterus by manipulation of said handles.

23. A vaginal applicator as set forth in claim 22 wherein: said container is formed of a thin impervious membrane capable of axial and radial crushing to discharge its contents on axial movement of said member, and said member is a plunger capable of free axial movement.

JOHN LESLIE JONES.

REFERENCES CITED

The following references are of record in the file of this patent:

UNITED STATES PATENTS

| Number | Name | Date |
|---|---|---|
| 603,045 | Palmer | Apr. 26, 1898 |
| 798,093 | Dean | Aug. 29, 1905 |
| 913,297 | Krautschneider | Feb. 23, 1909 |
| 1,677,603 | Steen | July 17, 1928 |
| 2,059,966 | Kaufman et al. | Nov. 3, 1936 |
| 2,072,327 | Friedman et al. | Mar. 2, 1937 |
| 2,080,134 | Jezler | May 11, 1937 |
| 2,318,928 | Deighton | May 11, 1943 |
| 2,338,448 | Lewis | Jan. 4, 1944 |
| 2,469,399 | Munson | May 10, 1949 |

FOREIGN PATENTS

| Number | Country | Date |
|---|---|---|
| 386,298 | Great Britain | Apr. 8, 1931 |
| 815,656 | France | Apr. 12, 1937 |